(12) United States Patent
Jiang (10) Patent No.: US 12,402,096 B2
(45) Date of Patent: Aug. 26, 2025

(54) COMMUNICATION PROCESSING METHOD AND APPARATUS, AND COMPUTER STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 312 days.

(21) Appl. No.: 17/799,424

(22) PCT Filed: Feb. 19, 2020

(86) PCT No.: PCT/CN2020/075901
§ 371 (c)(1),
(2) Date: Aug. 12, 2022

(87) PCT Pub. No.: WO2021/163934
PCT Pub. Date: Aug. 26, 2021

(65) Prior Publication Data
US 2023/0345406 A1    Oct. 26, 2023

(51) Int. Cl.
*H04W 64/00* (2009.01)
*H04W 68/00* (2009.01)
*H04W 74/0833* (2024.01)

(52) U.S. Cl.
CPC ......... *H04W 64/00* (2013.01); *H04W 68/005* (2013.01); *H04W 74/0833* (2013.01)

(58) Field of Classification Search
None
See application file for complete search history.

(56) References Cited

U.S. PATENT DOCUMENTS

| 2017/0006575 | A1 | 1/2017 | Cui et al. | |
| 2018/0249469 | A1* | 8/2018 | Park | H04W 72/0446 |
| 2018/0343635 | A1* | 11/2018 | Edge | H04W 88/08 |
| 2019/0132882 | A1* | 5/2019 | Li | H04L 27/2605 |
| 2020/0128443 | A1* | 4/2020 | Na | H04W 76/27 |

(Continued)

FOREIGN PATENT DOCUMENTS

| CN | 105338624 A | 2/2016 |
| CN | 107306448 A | 10/2017 |
| CN | 109451427 A | 3/2019 |

(Continued)

OTHER PUBLICATIONS

Chinese Office Action issued on Apr. 18, 2023 for Chinese Patent Application No. 202080000302.2.

(Continued)

*Primary Examiner* — Adnan Baig
(74) *Attorney, Agent, or Firm* — Volpe Koenig (57) ABSTRACT

A communication processing method, performed by a first base station and including: in response to receiving location assistance information for a radio resource control (RRC) inactive user equipment (UE) sent by a Location Management Function (LMF), sending a first paging message in a Radio Access Network (RAN) Notification Area (RNA) of the UE; and sending the location assistance information to the UE in a cell that receives a random access request returned on the basis of the first paging message.

19 Claims, 5 Drawing Sheets

(56) References Cited

U.S. PATENT DOCUMENTS

2020/0389868 A1* 12/2020 Martin .................. H04W 76/11
2021/0045083 A1* 2/2021 Liu ....................... H04W 64/00

FOREIGN PATENT DOCUMENTS

WO 2018/143117 A1 8/2018
WO 2019/153215 A1 8/2019

OTHER PUBLICATIONS

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)" 3GPPTS 36.305 v15.4.0, Jun. 30, 2019 (Jun. 30, 2019), entire document.

* cited by examiner

COMMUNICATION PROCESSING METHOD AND APPARATUS, AND COMPUTER STORAGE MEDIUM

CROSS-REFERENCE TO RELATED APPLICATION

The present application is a U.S. National Stage of International Application No. PCT/CN2020/075901, filed on Feb. 19, 2020, the contents of all of which are incorporated herein by reference in their entireties for all purposes.

BACKGROUND

In order to save the energy consumption of a user equipment (UE) and reduce the time delay of location, 5th generation mobile networks or 5th generation wireless systems (5G for short) put forward the requirements for location of radio resource control (RRC) idle and inactive UE.

SUMMARY

The disclosure relates to technology of communication, in particular to a communication processing method and apparatus, and a computer storage medium.

According to a first aspect of the disclosure, there is provided a communication processing method, performed by a base station, where the method includes:
  in response to receiving location assistance information for a Radio Resource Control (RRC) inactive user equipment (UE) sent by a Location Management Function (LMF), sending a first paging message in a Radio Access Network (RAN) Notification Area (RNA) of the UE; and
  sending the location assistance information to the UE in a cell that receives a random access request returned on the basis of the first paging message.

According to a second aspect of the disclosure, there is provided a communication processing method, performed by a user equipment (UE), where the method includes:
  receiving a first paging message in a Radio Access Network (RAN) Notification Area (RNA) of the UE when the UE is in an inactive state;
  sending a random access request to a cell where the UE is currently located on the basis of the first paging message; and
  receiving location assistance information sent by the cell where the UE is currently located.

According to a third aspect of the disclosure, there is provided a communication processing apparatus, applied to a base station, where the apparatus includes:
  a communication unit, configured to receive location assistance information for an inactive user equipment (UE) sent by a Location Management Function (LMF); and
  a processing unit, configured to send a first paging message in a Radio Access Network (RAN) Notification Area (RNA) of the UE in response to receiving the location assistance information for a radio resource control (RRC) inactive UE sent by the LMF; and send the location assistance information to the UE in a cell that receives a random access request returned on the basis of the first paging message.

According to a fourth aspect of the disclosure, there is provided a communication processing apparatus, applied to a user equipment (UE), where the apparatus includes:
  a second receiving unit, configured to receive a first paging message in a Radio Access Network (RAN) Notification Area (RNA) of the UE when the UE is in a RRC inactive state; and
  a second sending unit, configured to send a random access request to a cell where the UE is currently located on the basis of the first paging message;
  where the second receiving unit is further configured to receive location assistance information sent by the cell where the UE is currently located.

According to a fifth aspect of the disclosure, there is provided a communication processing apparatus, including:
  a processor; and
  a memory, configured to store processor executable instructions;
  where the processor is configured to implement any one of the communication processing methods applied to a base station by executing the executable instructions.

According to a sixth aspect of the disclosure, there is provided a communication processing apparatus, including:
  a processor; and
  a memory, configured to store processor executable instructions;
  where the processor is configured to implement any one of the communication processing methods applied to a UE by executing the executable instructions.

According to a seventh aspect of the disclosure, there is provided a non-transitory computer readable storage medium, where an executable instruction is stored in the computer storage medium, and any one of the communication processing methods applied to a base station can be implemented when the executable instruction is executed by a processor.

According to an eighth aspect of the disclosure, there is provided a non-transitory computer readable storage medium, where an executable instruction is stored in the computer storage medium, and any one of the communication processing methods applied to a UE can be implemented when the executable instruction is executed by a processor.

It should be understood that the above general description and the following detailed description are illustrative and interpretive, and cannot limit the disclosure.

BRIEF DESCRIPTION OF THE DRAWINGS

The drawings herein are incorporated into and constitute part of the description, illustrating examples conforming to the disclosure, and used together with the description to interpret the principles of the disclosure.

DETAILED DESCRIPTION

Examples will be described in detail, and the instances of the examples are represented in the drawings. In the case that the following description involves drawings, the same numbers in different drawings represent the same or similar elements unless otherwise stated. Implementation modes described in the following examples do not represent all Implementation modes consistent with the examples of the disclosure. Instead, they are instances of devices and methods consistent with some aspects of the examples of the disclosure as detailed in the appended claims.

The terms used in the examples of the disclosure are intended to describe particular examples, and are not intended to limit the examples of the disclosure. "a", "an" and "the" in a singular form used in the examples of the disclosure and the appended claims are also intended to include a plural form unless the context clearly represents other meanings. It should also be understood that the term "and/or" used in the disclosure refers to and includes any or all possible combinations of one or more associated listed items.

It should be understood that although the terms such as first, second, third, etc. may be employed in the examples of the disclosure to describe various information, these information should not be limited to these terms. These terms are used to distinguish a same type of information from each other. For example, without departing from the scope of the examples of the disclosure, first information may also be referred to as second information, similarly, the second information may also be referred to as the first information. Depending on the context, the words "if" and "in case" as used in the disclosure may be interpreted as "when" or "upon" or "in response to determining".

Figure 1:
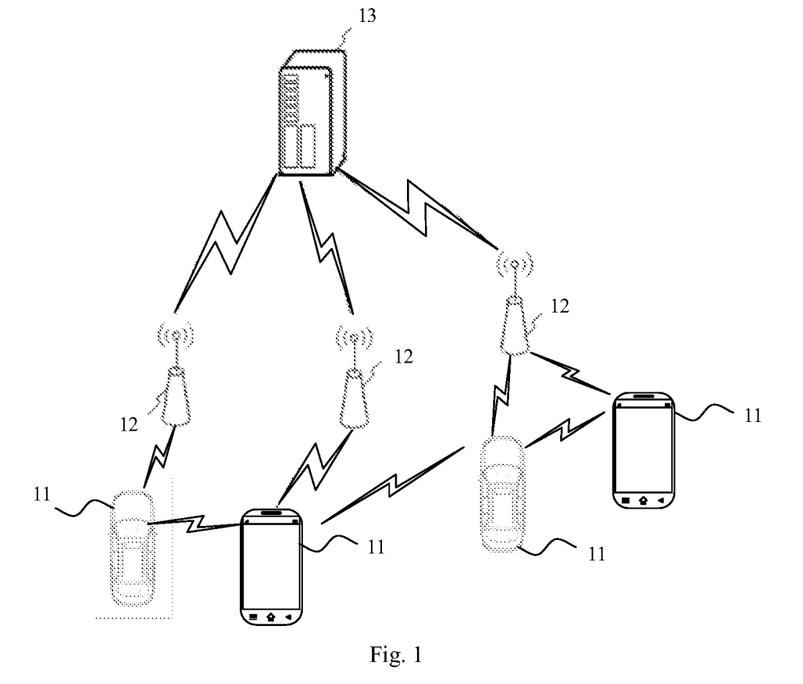
FIG. 1 is a structural schematic diagram of a wireless communication system according to one example.

Referring to FIG. 1, FIG. 1 shows a structural schematic diagram of a wireless communication system according to the examples of the disclosure. As shown in FIG. 1, a wireless communication system is a communication system based on a cellular mobile communication technology, and the wireless communication system may include more than one terminal 11 and more than one base station 12.

The terminal 11 may be a device that provides voice and/or data connectivity to a user. The terminal 11 may communicate with one or more core networks via a Radio Access Network (RAN). The terminal 11 may be an Internet of Things terminal, such as a sensor device, a mobile phone (or referred to as a "cellular" phone), and a computer having an Internet of Things terminal, for example, a stationary, portable, pocket-size, handheld, computer-built-in, or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Or, the terminal 11 may also be a device of an unmanned aerial vehicle. Or, the terminal 11 may also be a vehicle-mounted device, for example, a trip computer with a wireless communication function or a wireless communication device externally connected with a trip computer. Or, the terminal 11 may also be a roadside equipment, such as a street lamp, a signal lamp or other roadside equipment with a wireless communication function.

The base station 12 may be a network-side device in the wireless communication system. The wireless communication system can be a 4th generation mobile communication (4G) system, also known as a long term evolution (LTE) system. Or, the wireless communication system may also be a 5G system, also known as a new radio (NR) system or a 5G NR system. Or, the wireless communication system may also be a next generation system of the 5G system. An access network in the 5G system can be called as New Generation-Radio Access Network (NG-RAN). Or, the wireless communication system may be a machine-type communication (MTC) system.

The base station 12 may be an evolved base station (eNB) adopted in the 4G system. Or, the base station 12 may also be a base station using a centralized distributed architecture (gNB) in the 5G system. In the case that the base station 12 adopts the centralized distributed architecture, the base station 12 generally includes a central unit (CU) and at least two distributed units (DUs). The central unit is provided with protocol stacks of a packet data convergence protocol (PDCP) layer, a radio link control (RLC) protocol layer and a media access control (MAC) layer. The distributed unit is provided with a protocol stack of a physical (PHY) layer. The specific implementation of the base station 12 is not limited in the examples of the disclosure.

Wireless connection can be established between the base station 12 and the terminal 11 through a wireless air interface. In various implementations, the wireless air interface is a wireless air interface based on a 4th generation mobile communication network technology (4G) standard. Or, the wireless air interface is a wireless air interface based on a 5th generation mobile communication network technology (5G) standard, for example, the wireless air interface is a new radio. Or, the wireless air interface may also be a wireless air interface based on a next generation mobile communication network technology standard of 5G.

In some examples, an End to End (E2E) connection may also be established between the terminals 11, for example, vehicle-to-vehicle (V2V) communication, vehicle to infrastructure (V2I) communication, vehicle to pedestrian (V2P) communication and the like in vehicle to Everything (V2X).

In some examples, the wireless communication system may also include a network management device 13.

The more than one base station 12 are respectively connected with the network management device 13. The network management device 13 may be a core network device in the wireless communication system. For example, the network management device 13 may be a mobility management entity (MME) in an evolved packet core (EPC) network. Or, the network management device may also be other core network devices, such as a serving gate way (SGW), a public data network gate way (PGW), a policy and charging rules function (PCRF) unit, a home subscriber server (HSS) or the like. The implementation form of the network management device 13 is not limited in the examples of the disclosure.

Figure 2:
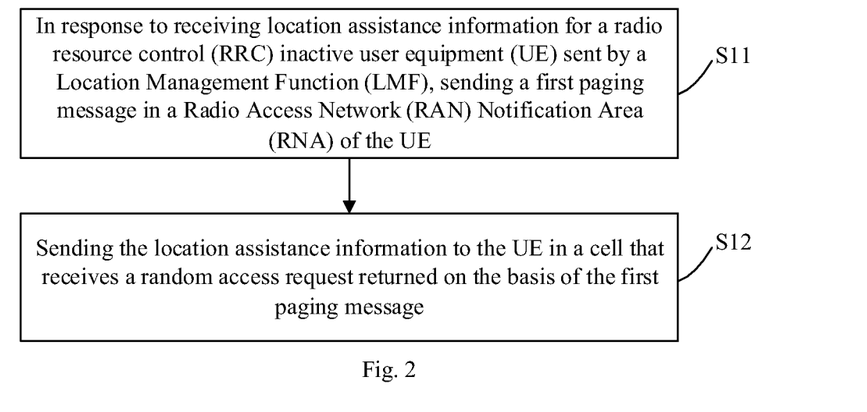
FIG. 2 is a flow chart 1 of a communication processing method according to one example.

More than one location technology is introduced into a release 16 (R16 for short) of the 5th generation mobile networks or 5th generation wireless systems (5G for short), so that location of radio resource control (RRC) connected to UE can be realized. For some of the location technologies, a Location Management Function (LMF) is required to provide location assistance information for the UE, as shown in FIG. 2.

In order to save the energy consumption of the UE and reduce the time delay of location, the 5G puts forward the requirements for location of RRC idle and inactive UE. For connected UE, because the LMF can determine a serving cell for the UE, the LMF sends location assistance information to the UE through the serving cell for the UE. However, for idle and inactive UE, the LMF usually cannot determine the serving cell where the UE is located, and the location assistance information may be sent to a certain base station or all base stations in a Radio Access Network (RAN) Notification Area (RNA) where the UE is located. Thus, after a certain base station or all base stations in the RNA where the UE is located receives/receive the location assistance information sent to the UE by the LMF, all base stations in the RNA need to send location assistance information to the UE because the base stations cannot determine a cell where the UE is located.

As the LMF cannot determine the position of the RRC inactive UE, the base station also cannot determine whether the UE is in the range of the base station after receiving the location assistance information sent to the UE by the LMF. All base stations in the RNA where the UE is located need to send the location assistance information to the UE, and unnecessary signaling overhead of the base stations is caused by this.

Based on the above wireless communication system, various examples of the method according to the disclosure are provided to save the signaling overhead.

FIG. 2 is a flow chart 1 of a communication processing method according to one example. As shown in FIG. 2, the communication processing method is performed by a network equipment such as a base station and includes the following steps.

In step S11, in response to receiving location assistance information for a radio resource control (RRC) inactive user equipment (UE) sent by a Location Management Function (LMF), sending a first paging message in a Radio Access Network (RAN) Notification Area (RNA) of the UE; and in step S12, sending the location assistance information to the UE in a cell that receives a random access request returned on the basis of the first paging message.

The first paging message includes location indication information, and the location indication information is used for UE location.

In some examples, sending the location assistance information to the UE includes: sending a first message carrying the location assistance information to the UE; where the first message is a random access message 4 (i.e., MSG4) or a random access message B (i.e., MSGB).

Thus, the base station can send the location assistance information through the MSG4 or the MSGB.

In some examples, sending the location assistance information to the UE includes:

sending a second paging message to the UE, where the second paging message includes the location assistance information.

In this way, the base station may send the location assistance information through the second paging message.

In some examples, sending the location assistance information to the UE includes:

sending a system message to the UE, where the system message includes the location assistance information.

In this way, the base station may send the location assistance information through the system message.

In an example, the base station includes a first base station and one or more second base stations; and in response to receiving the location assistance information for the RRC inactive UE sent by the LMF, sending the first paging message in the RNA of the UE includes:

in response to receiving, by the first base station, the location assistance information for the inactive UE sent by the LMF, sending the first paging message by the first base station, and forwarding the first paging message by one or more second base stations in the RNA; where the first paging message includes location indication information, and the location indication information is used for UE location.

Thus, the first base station notifies one or more second base stations in the RNA of the UE to forward the first paging message, and the cell where the UE is located can be determined as soon as possible, so that the cell that receives the random access request returned on the basis of the first paging message is facilitated to send the location assistance information to the UE. Thus, compared with a situation that all base stations in the RNA where the UE is located need to send the location assistance information to the UE, only the cell that receives the random access request returned on the basis of the first paging message sends the location assistance information to the UE, so that the signaling overhead can be reduced.

In an example, sending the location assistance information to the UE in the cell that receives the random access request returned on the basis of the first paging message includes:

in response to receiving, by the first base station, the random access request from the UE, sending the location assistance information to the UE in a cell corresponding to the first base station.

Thus, in response to the first base station receiving the random access request returned by the UE on the basis of the first paging message, it can be determined that the UE is in a cell corresponding to the first base station, and then location assistance information is sent to the UE. Compared with a situation that all base stations in the RNA where the UE is located need to send the location assistance information to the UE, only the cell that receives the random access request returned on the basis of the first paging message sends the location assistance information to the UE, so that the signaling overhead can be reduced.

In an example, sending the location assistance information to the UE in the cell that receives the random access request returned on the basis of the first paging message includes:

in response to receiving, by the second base station, the random access request from the UE, obtaining the location assistance information from the first base station and forwarding the location assistance information to the UE in a cell corresponding to the second base station.

Thus, in response to the second base station receiving the random access request returned by the UE on the basis of the first paging message, it can be determined that the UE is in a cell corresponding to the second base station, and then the location assistance information is obtained from the first base station and sent to the UE. Compared with a situation that all base stations in the RNA where the UE is located need to send the location assistance information to the UE, only the cell that receives the random access request returned on the basis of the first paging message sends the location assistance information to the UE, so that the signaling overhead can be reduced.

In some examples, the method further includes:

after receiving the random access request sent by the UE on the basis of the first paging message, the second base station determines, based on the random access request, whether the UE sending the random access request is the UE that is to receive the location assistance information.

In other words, the second base station may receive random access requests sent by more than one UE, and after the second base station receives the random access requests sent by the UEs, the second base station requests the first base station for the location assistance information for the UEs only when determining that the UEs are UEs that are to receive the location assistance information. In this way, a situation of mistakenly processing the random access request can be avoided.

In the examples of the disclosure, the first base station is an anchor base station, and the second base station is a non-anchor base station.

In some examples, the random access request includes a random access sequence, the random access sequence is a location-specific random access sequence, and the location-specific random access sequence is configured to indicate that the random access request is sent by a UE that is to receive the location assistance information. For example, the random access request is a random access message 1 (i.e., MSG1) or a random access message A (i.e., MSGA).

Thus, in response to the base station receiving the random access request including the location-specific random access sequence, the base station can determine that the UE sending the random access request is the UE that is to receive the location assistance information, that is, the base station can determine whether the UE is located in the cell corresponding to the base station according to the random access request.

In some examples, the random access request includes a random access sequence and the random access sequence is a location-specific random access sequence, and the method further includes: during a random access process, the base station sends a third message for confirming that the random access request is received to the UE; where the third message is a random access message 2 or a random access message B.

Thus, the base station sends the third message for confirming that the random access request is received to the UE, so that the UE no longer sends a new random access message (such as MSG3) to the base station, and the signaling overhead can be saved. Moreover, the base station can send the location assistance information to the UE after receiving the above random access request, so that the time delay of sending the location assistance information is reduced.

In some examples, the random access request includes a random access sequence, and the random access sequence is a general random access sequence; where the random access request further includes a UE identifier; and the UE identifier is configured to determine whether the UE sending the random access request is the UE that is to receive the location assistance information. For example, the random access request is a random access message 1 (i.e., MSG1) or a random access message A (i.e., MSGA).

Thus, in response to the base station receiving the random access request including the general random access sequence and the UE identifier, the base station can determine that the UE sending the random access request is the UE that is to receive the location assistance information, that is, the base station can determine whether the UE is located in the cell corresponding to the base station according to the random access request.

In some examples, the random access request includes a general random access sequence and a UE identifier, and the method further includes: during a random access process, the base station sends a third message for confirming that the random access request is received to the UE; where the third message is a random access message 2 or a random access message B.

Thus, the base station sends the third message for confirming that the random access request is received to the UE, so that the UE no longer sends a new random access message (such as MSG3) to the base station, and the signaling overhead can be saved. Moreover, the base station can send the location assistance information to the UE after receiving the above random access request, so that the time delay of sending the location assistance information is reduced.

In some examples, the random access request includes a random access sequence, and the random access sequence is a general random access sequence. For example, the random access request is a random access message 1 (i.e., MSG1) or a random access message A (i.e., MSGA). In the case that the random access request includes a random access sequence and the random access sequence is a general random access sequence, the method further includes: during a random access process, carrying information for indicating that the UE is maintained in an inactive state in a second message sent to the UE; where the second message is a random access message 4 or a random access message B.

Thus, the base station instructs the UE to be maintained in the inactive state instead of entering a connected state through the second message, so that the location assistance message is sent to the RRC inactive UE.

According to the technical solution in the examples of the disclosure, in response to receiving the location assistance information for the RRC inactive UE sent by the LMF, the first paging message is sent in the RNA of the UE; the location assistance information is sent to the UE in the cell that receives the random access request returned on the basis of the first paging message. In this way, it is avoided that all base stations in the RNA where the UE is located need to send the location assistance information to the UE, and it is the cell that receives the random access request returned on the basis of the first paging message to send the location assistance information to the UE, so that the signaling overhead can be reduced.

Figure 3:
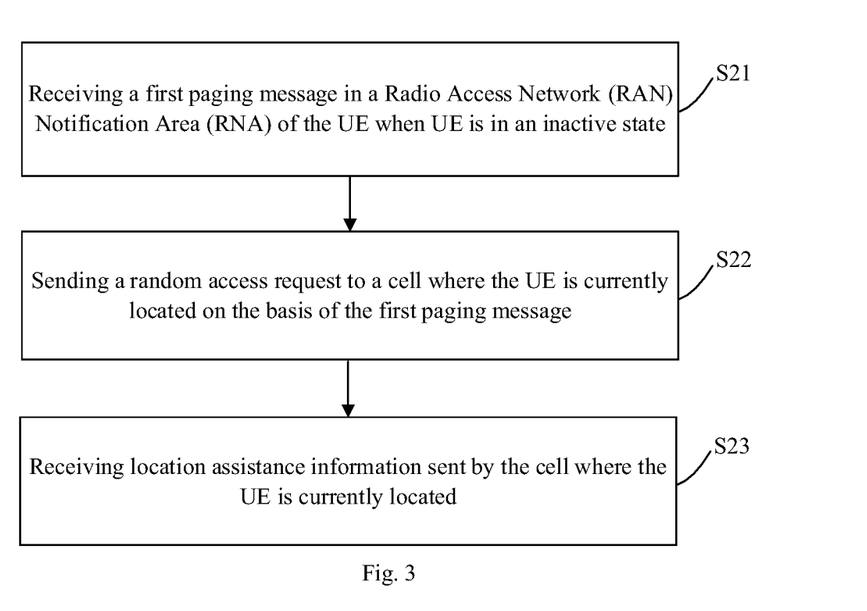
FIG. 3 is a flow chart 2 of a communication processing method according to one example.

FIG. 3 is a flow chart 2 of a communication processing method according to one example. As shown in FIG. 3, the communication processing method is applied in a user equipment (UE) and includes the following steps.

In step S21, receiving a first paging message in a Radio Access Network (RAN) Notification Area (RNA) of the UE when the UE is in an inactive state;

In step S22, sending a random access request to a cell where the UE is currently located on the basis of the first paging message; and In step S23, receiving location assistance information sent by the cell where the UE is currently located.

In some examples, sending the random access request to the cell where the UE is currently located on the basis of the first paging message includes:

in response to the first paging message including location indication information, sending the random access request including a random access sequence to the cell where the UE is currently located based on the location indication information, where the location indication information is used for UE location.

Thus, the UE sends the random access request to the cell where the UE is currently located on the basis of the first paging message, so as to obtain the location assistance information.

In some examples, the random access sequence is a location-specific random access sequence, and the location-specific random access sequence is configured to indicate that the random access request is sent by the UE that is to receive the location assistance information. For example, the random access request is a random access message 1 or a random access message A. In the case that the random access request includes a random access sequence and the random access sequence is a location-specific random access sequence, the method further includes: receiving a third message sent by the cell where the UE is currently located, the third message being a message for confirming that the random access request is received; and not sending a random access message to the base station during a random access process after receiving the third message sent by the cell where the UE is currently located; where the third message is a random access message 2 or a random access message B.

Thus, after the UE receives the third message for confirming that the random access request is received, the UE no longer sends a new random access message (such as MSG3) to the base station to which the random access request was sent, so that the signaling overhead can be saved.

In some examples, the random access sequence is a general random access sequence; where the random access request also carries a UE identifier; and the UE identifier is configured to determine whether the UE sending the random access request is the UE that is to receive the location assistance information. The random access request is a random access message 1 or a random access message A. In the case that the random access request includes a random access sequence and a UE identifier and the random access sequence is a general random access sequence, the method further includes: receiving a third message sent by the cell where the UE is currently located, the third message being a message for confirming that the random access request is received; and not sending a random access message to the base station during a random access process after receiving the third message sent by the cell where the UE is currently located; where the third message is a random access message 2 or a random access message B.

Thus, after the UE receives the third message for confirming that the random access request is received, the UE no longer sends a new random access message (such as MSG3) to the base station to which the random access request was sent, so that the signaling overhead can be saved.

In some examples, the random access sequence is a general random access sequence. For example, the random access request is a random access message 1 or a random access message A. In the case that the random access request includes a random access sequence and the random access sequence is a general random access sequence, the method further includes: receiving a second message sent by the cell where the UE is currently located, the second message carrying information indicating that the UE is maintained in an inactive state; and maintaining the UE in the inactive state based on the second message. For example, the second message is a random access message 4 or a random access message B.

Thus, after the UE receives the second message carrying the information indicating that the UE is maintained in the inactive state, the UE is maintained in the inactive state based on the second message, and it can be ensured that the location assistance information for the RRC inactive UE sent by the LMF can be received.

In some examples, receiving the location assistance information sent by the cell where the UE is currently located includes: receiving a second paging message which is sent by the cell where the UE is currently located and which carries the location assistance information; and the method further includes obtaining the location assistance information from the second paging message.

Thus, the UE can obtain the location assistance information for the RRC inactive UE through the second paging message.

In some examples, receiving the location assistance information sent by the cell where the UE is currently located includes: receiving a system message which is sent by the cell where the UE is currently located and which carries the location assistance information; and the method further includes obtaining the location assistance information from the system message.

Thus, the UE can obtain the location assistance information for the RRC inactive UE through the system message.

In some examples, receiving the location assistance information sent by the cell where the UE is currently located includes: receiving a first message sent by the cell where the UE is currently located, the first message being a random access message 4 or a random access message B; and the method further includes obtaining the location assistance information from the first message.

Thus, the UE can obtain the location assistance information for the RRC inactive UE through the first message.

According to the technical solution in the examples of the disclosure, the first paging message is received in the RNA of the UE when the UE is in an inactive state; the random access request is sent to the cell where the UE is currently located on the basis of the first paging message; the location assistance information sent by the cell where the UE is currently located is received; thus, under the condition that the signaling overhead is saved in the base station, the RRC inactive UE can obtain the location assistance information sent by the LMF, so that location of the RRC inactive UE is realized.

Figure 4:
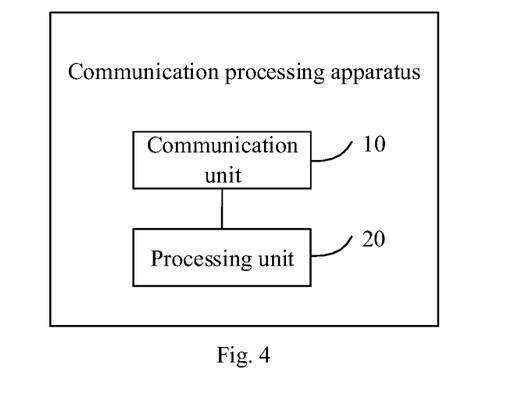
FIG. 4 is a block diagram 1 of a communication processing apparatus according to one example.

FIG. 4 is a block diagram 1 of a communication processing apparatus according to one example. The communication processing apparatus is applied to a base station, such as a first base station. With reference to FIG. 4, the apparatus includes a communication unit 10 and a processing unit 20.

The communication unit 10 is configured to receive location assistance information for inactive UE sent by a Location Management Function (LMF).

The processing unit 20 is configured to send a first paging message in a Radio Access Network (RAN) Notification Area (RNA) of the UE in response to receiving the location assistance information for a RRC inactive UE sent by the LMF; and send the location assistance information to the UE in a cell that receives a random access request returned on the basis of the first paging message.

In some examples, the processing unit 20 is further configured to:
  send a first message carrying the location assistance information to the UE; where the first message is a random access message 4 or a random access message B.

In some examples, the processing unit 20 is further configured to:

send a second paging message to the UE, where the second paging message includes the location assistance information.

In some examples, the processing unit 20 is further configured to:

send a system message to the UE, where the system message includes the location assistance information.

In some examples, the processing unit 20 is further configured to:

carry information indicating that the UE is maintained in an inactive state in a second message sent to the UE during a random access process; where the second message is a random access message 4 or a random access message B.

In some examples, the processing unit 20 is further configured to:

send a third message for confirming that the random access request is received to the UE during a random access process; where the third message is a random access message 2 or a random access message B.

In some examples, the processing unit 20 is further configured to:

in response to receiving the location assistance information for the inactive UE sent by the LMF, send the first paging message and forward the first paging message through one or more second base stations in the RNA; where the first paging message includes location indication information, and the location indication information is used for UE location.

In some examples, the processing unit 20 is further configured to:

in response to receiving, by the first base station, the random access request from the UE, send the location assistance information to the UE in a cell corresponding to the first base station.

In some examples, the processing unit 20 is further configured to:

in response to receiving, by the second base station, the random access request from the UE, forward the location assistance information to the second base station, so that the second base station forwards the location assistance information to the UE in a cell corresponding to the second base station.

In an example, the random access request includes a random access sequence, the random access sequence is a location-specific random access sequence, and the location-specific random access sequence is configured to indicate that the random access request is sent by the UE that is to receive the location assistance information.

In an example, the random access request includes a random access sequence, and the random access sequence is a general random access sequence; and the random access request further includes a UE identifier; and the UE identifier is configured to determine whether the UE sending the random access request is the UE that is to receive the location assistance information.

In an example, the random access request includes a random access sequence, and the random access sequence is a general random access sequence.

In an example, the random access request is a random access message 1 or a random access message A.

Regarding the apparatus in the examples, a specific mode for each module to execute operation has been described in detail in the examples of the method, and will not be repeated in detail here.

In practical application, the specific structures of the communication unit 10 and the processing unit 20 can be realized by a central processing unit (CPU), a micro controller unit (MCU), a digital signal processor (DSP) or a programmable logic controller (PLC) and the like in the communication processing apparatus or a base station to which the communication processing apparatus belongs.

The communication processing apparatus in this example can be arranged on a first base station, such as an anchor base station.

Those skilled in the art should understand that the function of each processing module in the communication processing apparatus in the examples of the disclosure can be understood by referring to related description of the communication processing method applied to the base station, such as the first base station; and each processing module in the communication processing apparatus in the examples of the disclosure can be realized through an analog circuit for realizing the functions in the examples of the disclosure, and can also be realized through operation of software for executing the functions in the examples of the disclosure on a terminal.

According to the communication processing apparatus provided by the examples of the disclosure, the location assistance information can be sent to the RRC inactive UE, so that the signaling overhead is saved.

Figure 5:
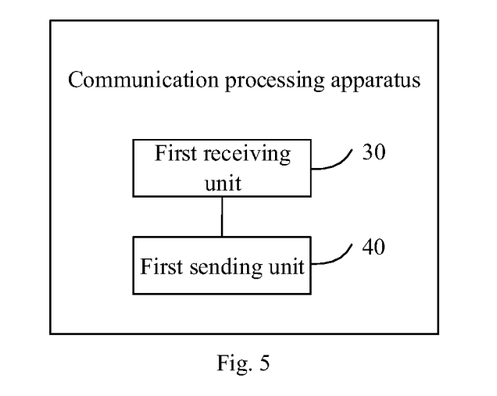
FIG. 5 is a block diagram 2 of a communication processing apparatus according to one example.

FIG. 5 is a block diagram 2 of a communication processing apparatus according to one example. The communication processing apparatus is applied to a base station, such as a second base station. With reference to FIG. 5, the apparatus includes a first receiving unit 30 and a first sending unit 40.

The first receiving unit 30 is configured to receive a first paging message sent by a first base station after the first base station receives location assistance information for inactive UE sent by a Location Management Function (LMF).

The first sending unit 40 is configured to send the first paging message in a cell corresponding to the second base station.

The first receiving unit 30 is configured to receive a random access request sent on the basis of the first paging message by the UE.

The first sending unit 40 is configured to request the location assistance information from the first base station in response to the random access request sent by the UE being received; and send the location assistance information received from the first base station in a cell corresponding to the second base station.

Regarding the apparatus in the example, a specific mode for each module to execute operation has been described in detail in the examples of the method, and will not be repeated in detail here.

In practical application, the specific structures of the first receiving unit 30 and the first sending unit 40 can be realized by a CPU, an MCU, a DSP or a PLC and the like in the communication processing apparatus or a base station to which the communication processing apparatus belongs.

The communication processing apparatus can be arranged on a second base station, such as a non-anchor base station.

Those skilled in the art should understand that the function of each processing module in the communication processing apparatus in the examples of the disclosure can be understood by referring to related description of the communication processing method applied to the base station, such as the second base station; and each processing module in the communication processing apparatus in the examples of the disclosure can be realized through an analog circuit for realizing the functions in the examples of the disclosure, and can also be realized through operation of software for executing the functions in the examples of the disclosure on a terminal.

According to the communication processing apparatus provided by the examples of the disclosure, the location assistance information can be sent to the RRC inactive UE, so that the signaling overhead is saved.

Figure 6:
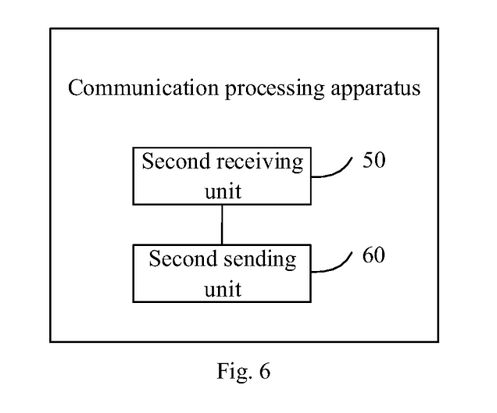
FIG. 6 is a block diagram 3 of a communication processing apparatus according to one example.

FIG. 6 is a block diagram 3 of a communication processing apparatus according to one example. The communication processing apparatus is applied to a UE. With reference to FIG. 6, the apparatus includes a second receiving unit 50 and a second sending unit 60.

The second receiving unit 50 is configured to receive a first paging message in a Radio Access Network (RAN) Notification Area (RNA) of the UE when the UE is in an RRC inactive state.

The second sending unit 60 is configured to send a random access request to a cell where the UE is currently located on the basis of the first paging message.

The second receiving unit 50 is further configured to receive location assistance information sent by the cell where the UE is currently located.

Regarding the apparatus in the examples, a specific mode for each module to execute operation has been described in detail in the examples of the method, and will not be described in detail here.

In practical application, the specific structures of the second receiving unit 50 and the second sending unit 60 can be realized by a CPU, an MCU, a DSP or a PLC and the like in the communication processing apparatus or a terminal to which the communication processing apparatus belongs.

The communication processing apparatus in this example can be arranged on a terminal side.

Those skilled in the art should understand that the function of each processing module in the communication processing apparatus in the examples of the disclosure can be understood by referring to related description of the communication processing method applied to the UE; and each processing module in the communication processing apparatus in the examples of the disclosure can be realized through an analog circuit for realizing the functions in the examples of the disclosure, and can also be realized through operation of software for executing the functions in the examples of the disclosure on a terminal.

According to the communication processing apparatus in the examples of the disclosure, the location assistance information can be received in the RRC inactive state under the condition that the signaling overhead is saved in the base station, so that location of the RRC inactive UE is completed.

Figure 7:
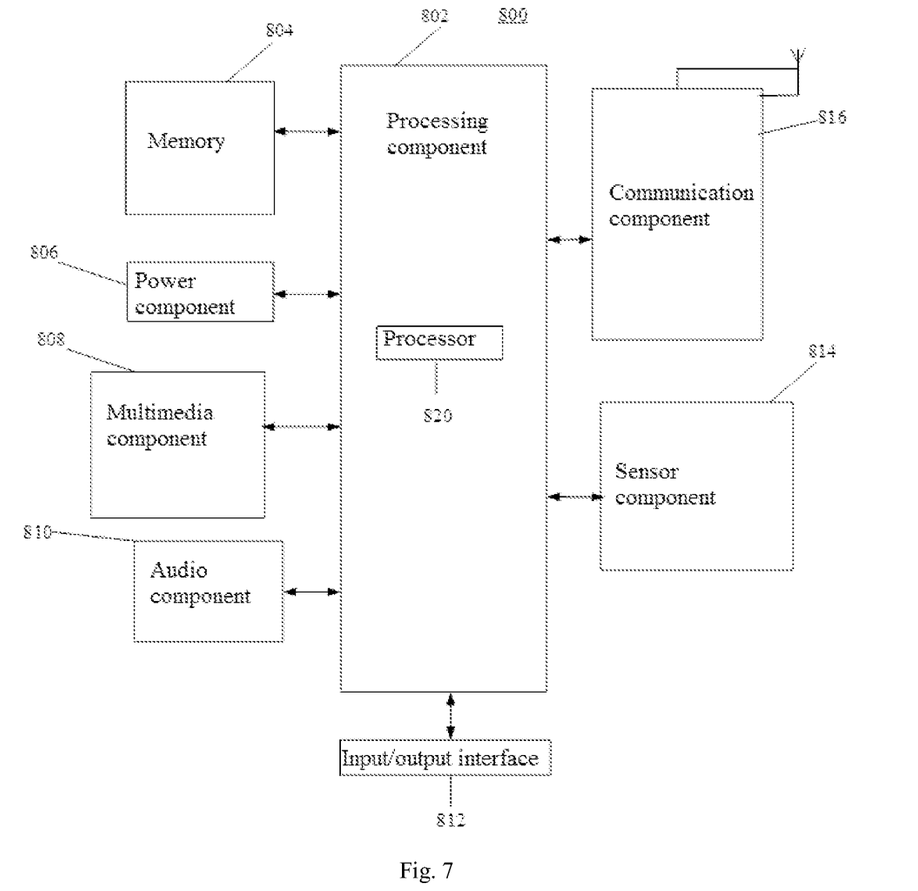
FIG. 7 is a block diagram 1 of a device 800 for implementing communication processing according to one example.

FIG. 7 is a block diagram of a device 800 for implementing communication processing according to one example. For example, the device 800 may be a mobile phone, a computer, a digital broadcast terminal, a messaging device, a game console, a tablet device, a medical device, a fitness device, a personal digital assistant, etc.

With reference to FIG. 7, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as operations associated with display, telephone calls, data communications, camera operations, and recording operations. The processing component 802 may include one or more processors 820 to execute instructions to complete all or part of the steps of the above method. Further, the processing component 802 may include one or more modules, facilitating interaction between the processing component 802 and other components. For example, the processing component 802 may include a multimedia module to facilitate interaction between the multimedia component 808 and the processing component 802.

The memory 804 is configured to store various types of data to support operation at the device 800. Examples of these data include instructions for any application or method operating on the device 800, contact data, phonebook data, messages, pictures, videos, etc. The memory 804 can be implemented by any type of volatile or non-volatile memory device or their combination, such as a static random-access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic disk or an optical disk.

The power component 806 provides power to various components of the device 800. The power component 806 may include a power management system, one or more power sources, and other components associated with generating, managing, and distributing power for the device 800.

The multimedia component 808 includes a screen between the device 800 and a user that provides an output interface. In some examples, the screen may include a liquid crystal display (LCD), and a touch panel (TP). If the screen includes the touch panel, the screen may be implemented as a touch screen to receive an input signal from the user. The touch panel includes one or more touch sensors to sense touches, slides, and gestures on the touch panel. The touch sensor may not only sense boundaries of a touch or slide action, but also detect duration and pressure associated with the touch or slide action. In some examples, the multimedia component 808 includes a front camera and/or a rear camera. When the device 800 is in an operation mode, such as a shooting mode or a video mode, the front camera and/or the rear camera can receive external multimedia data. Each front camera and each rear camera may be a fixed optical lens system or have a focal length and optical zoom capability.

The audio component 810 is configured to output and/or input an audio signal. For example, the audio component 810 includes a microphone (MIC for short) configured to receive an external audio signal when the device 800 is in an operating mode, such as a call mode, a recording mode, and a voice recognition mode. The received audio signal may be further stored in the memory 804 or transmitted via the communication component 816. In some examples, the audio component 810 further includes a speaker for outputting the audio signal.

The I/O interface 812 provides an interface between the processing component 802 and a peripheral interface module, and the peripheral interface module can be a keyboard, a click wheel, a button and the like. These buttons may include, but are not limited to, a homepage button, a volume button, a start button, and a lock button.

The sensor component 814 includes one or more sensors for providing various aspects of state evaluation for the device 800. For example, the sensor component 814 may detect an on/off state of the device 800, relative positioning of the components, such as a display and keypad of the device 800, and may also detect a change in position of the device 800 or one component of the device 800, the presence or absence of contact of a user with the device 800, the orientation or acceleration/deceleration of the device 800 and a temperature change of the device 800. The sensor component 814 may include a proximity sensor configured to detect the presence of a nearby object without any physical contact. The sensor component 814 may further include a light sensor, such as a complementary metal oxide semiconductor (CMOS) or a charge-coupled device (CCD) image sensor, for use in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless communication between the device 800 and other devices. The device 800 may access a wireless network based on a communication standard, such as Wi-Fi, 2G or 3G, or their combination. In one example, the communication component 816 receives broadcast signals or broadcast related information from an external broadcast management system via a broadcast channel. In one example, the communication component 816 further includes a near field communication (NFC) module to facilitate short range communication. For example, the NFC module may be implemented on the basis of a radio frequency identification (RFID) technology, an infrared data association (IrDA) technology, an ultra wide band (UWB) technology, a Bluetooth (BT) technology, and other technologies.

In the examples, the device 800 can be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic components for executing the communication processing method applied to the user terminal side.

In the examples, a non-transitory computer readable storage medium is also provided that includes executable instructions, such as a memory 804 that includes executable instructions that can be executed by a processor 820 of the device 800 to complete the above method. For example, the non-transitory computer readable storage medium may be a ROM, a random access memory (RAM), a CD-ROM, a magnetic tape, a floppy disk, an optical data storage device, or the like.

Figure 8:
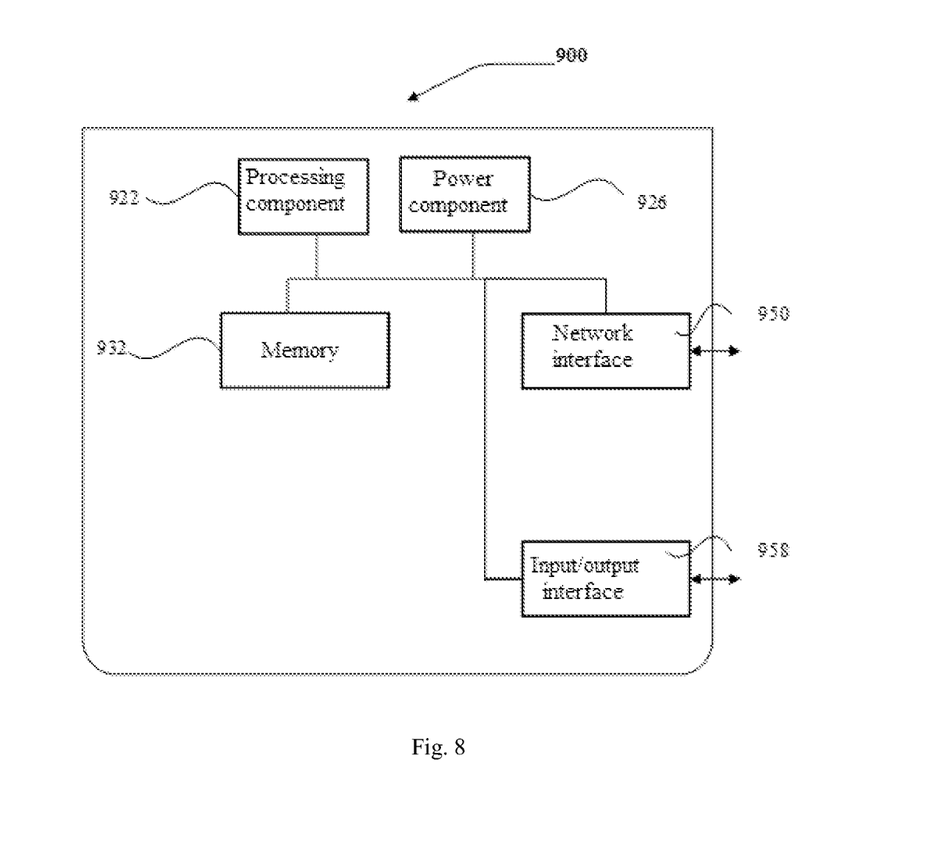
FIG. 8 is a block diagram 2 of a device 900 for implementing communication processing according to one example.

FIG. 8 is a block diagram of a device 900 for communication processing according to one example. For example, the device 900 may be provided as a server. With reference to FIG. 8, the device 900 includes a processing component 922, and further includes one or more processors, and memory resources represented by a memory 932 for storing instructions, such as applications, executable by the processing component 922. An application stored in the memory 932 may include one or more modules each corresponding to a set of instructions. In addition, the processing component 922 is configured to execute an instruction to execute the communication processing method applied to the base station.

The device 900 may further include a power component 926 configured to perform power management of the device 900, a wired or wireless network interface 950 configured to connect the device 900 to a network, and an input/output (I/O) interface 958. The device 900 can operate on the basis of an operating system stored in the memory 932, such as Windows Server™, Mac OS X™, Unix™, Linux™, FreeBSD™ or the like.

Additional non-limiting embodiments of the disclosure include the following.

According to a first aspect of the disclosure, there is provided a communication processing method, performed by a base station, where the method includes:
  in response to receiving location assistance information for a Radio Resource Control (RRC) inactive user equipment (UE) sent by a Location Management Function (LMF), sending a first paging message in a Radio Access Network (RAN) Notification Area (RNA) of the UE; and
  sending the location assistance information to the UE in a cell that receives a random access request returned on the basis of the first paging message.

In an example, the base station includes a first base station and one or more second base stations; and in response to receiving the location assistance information for the RRC inactive UE sent by the LMF, sending the first paging message in the RNA of the UE includes:
  in response to receiving, by the first base station, the location assistance information for the inactive UE sent by the LMF, sending the first paging message by the first base station, and forwarding the first paging message by the one or more second base stations in the RNA; where the first paging message includes location indication information, and the location indication information is used for UE location.

In an example, sending the location assistance information to the UE in the cell that receives the random access request returned on the basis of the first paging message includes:
  in response to receiving, by the first base station, the random access request from the UE, sending the location assistance information to the UE in a cell corresponding to the first base station.

In an example, sending the location assistance information to the UE in the cell that receives the random access request returned on the basis of the first paging message includes:
  in response to receiving, by the second base station, the random access request from the UE, obtaining the location assistance information from the first base station, and forwarding the location assistance information to the UE in a cell corresponding to the second base station.

In an example, the random access request includes a random access sequence, the random access sequence is a location-specific random access sequence, and the location-specific random access sequence is configured to indicate that the random access request is sent by UE that is to receive the location assistance information.

In an example, the random access request includes a random access sequence, and the random access sequence is a general random access sequence; and
  the random access request further includes a UE identifier, and the UE identifier is configured to determine whether the UE sending the random access request is the UE that is to receive the location assistance information.

In an example, the random access request includes a random access sequence, and the random access sequence is a general random access sequence.

In an example, the random access request is a random access message 1 or a random access message A.

In an example, sending the location assistance information to the UE includes:

sending a first message carrying the location assistance information to the UE; where the first message is a random access message 4 or a random access message B.

In an example, sending the location assistance information to the UE includes:
sending a second paging message to the UE, where the second paging message includes the location assistance information.

In an example, sending the location assistance information to the UE includes:
sending a system message to the UE, where the system message includes the location assistance information.

In an example, the method further includes:
carrying information indicating that the UE is maintained in an inactive state in a second information sent to the UE during a random access process; where the second message is a random access message 4 or a random access message B.

In an example, the method further includes:
sending a third message for confirming that the random access request is received to the UE during a random access process; where the third message is a random access message 2 or a random access message B.

According to a second aspect of the disclosure, there is provided a communication processing method, performed by a user equipment (UE), where the method includes:
receiving a first paging message in a Radio Access Network (RAN) Notification Area (RNA) of the UE when the UE is in an inactive state;
sending a random access request to a cell where the UE is currently located on the basis of the first paging message; and
receiving location assistance information sent by the cell where the UE is currently located.

In an example, sending the random access request to the cell where the UE is currently located on the basis of the first paging message includes:
in response to the first paging message including location indication information, sending the random access request including a random access sequence to the cell where the UE is currently located based on the location indication information, where the location indication information is used for UE location.

In an example, the random access sequence is a location-specific random access sequence, and the location-specific random access sequence is configured to indicate that the random access request is sent by the UE that is to receive the location assistance information.

In an example, the random access sequence is a general random access sequence; where the random access request further carries a UE identifier, and the UE identifier is configured to determine whether the UE sending the random access request is the UE that is to receive the location assistance information.

In an example, the random access sequence is a general random access sequence.

In an example, the random access request is a random access message 1 or a random access message A.

In an example, receiving the location assistance information sent by the cell where the UE is currently located includes:
receiving a second paging message carrying the location assistance information and sent by the cell where the UE is currently located; and
obtaining the location assistance information from the second paging message.

In an example, receiving the location assistance information sent by the cell where the UE is currently located includes:
receiving a system message which carries the location assistance information and which is sent by the cell where the UE is currently located; and
obtaining the location assistance information from the system message.

In an example, receiving the location assistance information sent by the cell where the UE is currently located includes:
receiving a first message sent by the cell where the UE is currently located; and
obtaining the location assistance information from the first message, where the first message is a random access message 4 or a random access message B.

In an example, the method further includes:
receiving a second message sent by the cell where the UE is currently located, where the second message carries information indicating that the UE is maintained in an inactive state; and
maintaining the UE in the inactive state based on the second message, where the second message is a random access message 4 or a random access message B.

In an example, the method further includes:
receiving a third message sent by the cell where the UE is currently located, where the third message is a message for confirming that the random access request is received; and
not sending a random access message to the base station in a random access process after receiving the third message sent by the cell where the UE is currently located; where the third message is a random access message 2 or a random access message B.

According to a third aspect of the disclosure, there is provided a communication processing apparatus, applied to a base station, where the apparatus includes:
a communication unit, configured to receive location assistance information for an inactive user equipment (UE) sent by a Location Management Function (LMF); and
a processing unit, configured to send a first paging message in a Radio Access Network (RAN) Notification Area (RNA) of the UE in response to receiving the location assistance information for a radio resource control (RRC) inactive UE sent by the LMF; and send the location assistance information to the UE in a cell that receives a random access request returned on the basis of the first paging message.

According to a fourth aspect of the disclosure, there is provided a communication processing apparatus, applied to a user equipment (UE), where the apparatus includes:
a second receiving unit, configured to receive a first paging message in a Radio Access Network (RAN) Notification Area (RNA) of the UE when the UE is in a RRC inactive state; and
a second sending unit, configured to send a random access request to a cell where the UE is currently located on the basis of the first paging message;
where the second receiving unit is further configured to receive location assistance information sent by the cell where the UE is currently located.

According to a fifth aspect of the disclosure, there is provided a communication processing apparatus, including:
a processor; and
a memory, configured to store processor executable instructions;

where the processor is configured to implement any one of the communication processing methods applied to a base station by executing the executable instructions.

According to a sixth aspect of the disclosure, there is provided a communication processing apparatus, including:
a processor; and
a memory, configured to store processor executable instructions;
where the processor is configured to implement any one of the communication processing methods applied to a UE by executing the executable instructions.

According to a seventh aspect of the disclosure, there is provided a non-transitory computer storage medium, where an executable instruction is stored in the computer storage medium, and any one of the communication processing methods applied to a base station can be implemented when the executable instruction is executed by a processor.

According to an eighth aspect of the disclosure, there is provided a non-transitory computer readable storage medium, where an executable instruction is stored in the computer readable storage medium, and any one of the communication processing methods applied to a UE can be implemented when the executable instruction is executed by a processor.

The technical solutions recited in the examples of the disclosure can be arbitrarily combined under the condition of no conflict.

Other implementations of the present disclosure will be readily conceived by those skilled in the art after taking into account the description and practicing the disclosure disclosed herein. The disclosure aims to cover any variation, use or adaptive variation of the disclosure, the variation, use or adaptive variation follows the general principles of the disclosure and includes the known common knowledge or habitual technical means in the art, which is not disclosed by the disclosure. The description and examples are considered only illustrative, and the true scope and spirit of the disclosure are indicated by the following claims.

It should be understood that the disclosure is not limited to the precise structures that have been described above and shown in the drawings, and that various modifications and changes can be made without departing from the scope. The scope of the disclosure is limited only by the appended claims.

What is claimed is:

1. A communication processing method, performed by a base station, wherein the method comprises:
   in response to receiving location assistance information for a radio resource control (RRC) inactive user equipment (UE) sent by a Location Management Function (LMF), sending a first paging message in a Radio Access Network (RAN) Notification Area (RNA) of the UE; and
   sending the location assistance information to the UE in a cell that receives a random access request returned on the basis of the first paging message, and
   wherein the base station comprises a first base station and one or more second base stations, and in response to receiving the location assistance information for the RRC inactive UE sent by the LMF, sending the first paging message in the RNA of the UE comprises:
      in response to receiving, by the first base station, the location assistance information for the RRC inactive UE sent by the LMF, sending the first paging message by the first base station and forwarding the first paging message by the one or more second base stations in the RNA; wherein the first paging message comprises location indication information, and the location indication information is used for UE location.

2. The method according to claim 1, wherein sending the location assistance information to the UE in the cell that receives the random access request returned on the basis of the first paging message comprises:
   in response to receiving, by the first base station, the random access request from the UE, sending the location assistance information to the UE in a cell corresponding to the first base station; or
   in response to receiving, by the second base station, the random access request from the UE, obtaining the location assistance information from the first base station and forwarding the location assistance information to the UE in a cell corresponding to the second base station.

3. The method according to claim 1, wherein
   the random access request comprises a random access sequence, and the random access sequence is a location-specific random access sequence, wherein the location-specific random access sequence is configured to indicate that the random access request is sent by the UE that is to receive the location assistance information;
   or
   the random access request comprises a random access sequence, and the random access sequence is a general random access sequence; wherein the random access request further comprises a UE identifier; and the UE identifier is configured to determine whether the UE sending the random access request is the UE that is to receive the location assistance information.

4. The method according to claim 1, wherein the random access request comprises a random access sequence, and the random access sequence is a general random access sequence.

5. The method according to claim 3, wherein the random access request is a random access message 1 or a random access message A.

6. The method according to claim 1, wherein sending the location assistance information to the UE comprises one of the following:
   sending a first message carrying the location assistance information to the UE; wherein the first message is a random access message 4 or a random access message B;
   sending a second paging message to the UE, wherein the second paging message comprises the location assistance information; and
   sending a system message to the UE, wherein the system message comprises the location assistance information.

7. The method according to claim 4, wherein the method further comprises:
   carrying information indicating that the UE is maintained in an inactive state in a second message sent to the UE during a random access process; wherein the second message is a random access message 4 or a random access message B.

8. The method according to claim 3, wherein the method further comprises:
   sending a third message for confirming that the random access request is received to the UE during a random access process; wherein the third message is a random access message 2 or a random access message B.

9. A communication processing method, performed by a radio resource control (RRC) inactive user equipment (UE), wherein the method comprises:
receiving a first paging message in a Radio Access Network (RAN) Notification Area (RNA) of the UE when the UE is in an inactive state, wherein
the first paging message is sent by a base station in the RNA of the UE in response to the base station receiving location assistance information for the UE sent by a Location Management Function (LMF),
the base station comprises a first base station and one or more second base stations, and
the first paging message is sent, in response to the first base station receiving the location assistance information sent by the LMF, by the first base station and is forwarded by the one or more second base stations to the UE; wherein the first paging message comprises location indication information, and the location indication information is used for UE location;
sending a random access request to a cell where the UE is currently located on the basis of the first paging message; and
receiving the location assistance information sent by the cell where the UE is currently located.

10. The method according to claim 9, wherein sending the random access request to the cell where the UE is currently located on the basis of the first paging message comprises:
in response to the first paging message comprising the location indication information, sending the random access request comprising a random access sequence to the cell where the UE is currently located based on the location indication information.

11. The method according to claim 10, wherein
the random access sequence is a location-specific random access sequence, wherein the location-specific random access sequence is configured to indicate that the random access request is sent by the UE that is to receive the location assistance information;
or
the random access sequence is a general random access sequence; wherein the random access request further carries a UE identifier; the UE identifier is configured to determine whether the UE sending the random access request is the UE that is to receive the location assistance information.

12. The method according to claim 10, wherein the random access sequence is a general random access sequence.

13. The method according to claim 9, wherein receiving the location assistance information sent by the cell where the UE is currently located comprises one of the following:
receiving a second paging message carrying the location assistance information and sent by the cell where the UE is currently located, and obtaining the location assistance information from the second paging message;
receiving a system message carrying the location assistance information and sent by the cell where the UE is currently located, and obtaining the location assistance information from the system message;
receiving a first message sent by the cell where the UE is currently located, and obtaining the location assistance information from the first message, wherein the first message is a random access message 4 or a random access message B.

14. The method according to claim 12, wherein the method further comprises:

receiving a second message sent by the cell where the UE is currently located, wherein the second message carries information indicating that the UE is maintained in the inactive state; and
maintaining the UE in the inactive state based on the second message; wherein the second message is a random access message 4 or a random access message B.

15. The method according to claim 11, wherein the method further comprises:
receiving a third message sent by the cell where the UE is currently located, wherein the third message is a message for confirming that the random access request is received; and
not sending a random access message to the base station during a random access process after receiving the third message sent by the cell where the UE is currently located; wherein the third message is a random access message 2 or a random access message B.

16. A communication processing apparatus, applied to a base station, comprising:
a processor; and
a memory, configured to store executable instructions;
wherein the processor is configured to execute the executable instructions to:
in response to receiving location assistance information for a radio resource control (RRC) inactive user equipment (UE) sent by a Location Management Function (LMF), send a first paging message in a Radio Access Network (RAN) Notification Area (RNA) of the UE; and
send the location assistance information to the UE in a cell that receives a random access request returned on the basis of the first paging message;
wherein the base station comprises a first base station and one or more second base stations; and in response to receiving the location assistance information for the RRC inactive UE sent by the LMF, send the first paging message in the RNA of the UE comprises:
in response to receiving, by the first base station, the location assistance information for the inactive UE sent by the LMF, sending the first paging message by the first base station and forwarding the first paging message by the one or more second base stations in the RNA; wherein the first paging message comprises location indication information, and the location indication information is used for UE location.

17. A communication processing apparatus, comprising:
a processor; and
a memory, configured to store executable instructions;
wherein the processor is configured to implement the communication processing method according to claim 9 when executing the executable instructions.

18. A non-transitory computer readable storage medium, wherein an executable instruction is stored in the computer readable storage medium, and when the executable instruction is executed by a processor, the processor is enabled to execute the communication processing method according to claim 1.

19. A non-transitory computer readable storage medium, wherein an executable instruction is stored in the computer readable storage medium, and when the executable instruction is executed by a processor, the processor is enabled to execute the communication processing method according to claim 9.

* * * * *